United States Patent [19]

Clarke

[11] Patent Number: 4,761,183
[45] Date of Patent: Aug. 2, 1988

[54] GROUTING COMPOSITION COMPRISING SLAG

[75] Inventor: William J. Clarke, 162 Spencer Pl., Ridgewood, N.J. 07450

[73] Assignees: Geochemical Corporation; William J. Clarke, both of Ridgewood, N.J.

[21] Appl. No.: 4,668

[22] Filed: Jan. 20, 1987

[51] Int. Cl.$^4$ .............................................. C01B 7/14
[52] U.S. Cl. ..................................... 106/117; 52/744
[58] Field of Search ........................... 106/117; 52/744

[56] References Cited

U.S. PATENT DOCUMENTS

| | | | |
|---|---|---|---|
| 3,923,534 | 12/1975 | Cassidy | 106/85 |
| 4,054,460 | 10/1977 | Buchet et al. | 106/97 |
| 4,126,003 | 11/1978 | Tomic | 106/90 |
| 4,126,005 | 11/1978 | Coursen | 106/90 |
| 4,127,001 | 11/1978 | Tomic | 106/90 |
| 4,174,227 | 11/1979 | Tomic | 106/85 |
| 4,302,251 | 11/1981 | Udagawa et al. | 106/92 |
| 4,306,910 | 12/1981 | Miyoshi | 106/117 |
| 4,402,749 | 9/1983 | Hall | 106/76 |
| 4,415,364 | 11/1983 | Naito | 106/84 |
| 4,443,260 | 4/1984 | Miyoshi | 106/117 |
| 4,487,632 | 12/1984 | Sherif et al. | 106/85 |
| 4,505,752 | 3/1985 | Sherif et al. | 106/85 |
| 4,545,797 | 10/1985 | Ecattar | 106/117 |

FOREIGN PATENT DOCUMENTS

| | | | |
|---|---|---|---|
| 57-67051 | 4/1982 | Japan . | |
| 57-164186 | 10/1982 | Japan . | |
| 61-48470 | 3/1986 | Japan | 106/117 |

OTHER PUBLICATIONS

*Concrete Manual,* 8th ed., USDI, pp. 439–441 (1981).
"Ultra-Superfine Grout Material-Onoda MC", Onoda Cement Co., 1-1-7, Toyosu, Koto-Ku, Tokyo, Japan, Note "10-79 F. P.", at bottom of last page (28).
"Performance Characteristics of Microfine Cement", by William J. Clarke, Preprint 84-023, Am. Soc. Civil Engineers Convention, Atlanta, Ga., May 14, 1984.
"Ultra Fine Grouting Material", by M. Shimoda and H. Ohmori, Proceedings of the Conference on Grouting in Geotechnical Engineering, Feb. 10–12, 1982, ASCE.
"Ultrafine Cement Pressure Grouting to Control Ground Water in Fractured Granite Rock", by D. W. Moller et al, Paper SP83-8, American Concrete Institute, Kansas City, Sep. 29, 1983.

*Primary Examiner*—William R. Dixon, Jr.
*Assistant Examiner*—Andrew B. Griffis
*Attorney, Agent, or Firm*—Harold L. Greenwald

[57] ABSTRACT

A grouting composition, a method of grouting and a formation so grouted are disclosed. The composition comprises a very small particle size slag, an equal or greater weight of water and the optional components cement, alkali silicate, anionic dispersant, a source of orthophosphate ions, sodium hydroxide and sodium carbonate. The grout is particularly adapted to the treatment of "tight" or low permeability formations being low in viscosity and having controllable set time and hardening time as well as high strength upon hardening. Being based on slag, a byproduct, the grout is economical.

17 Claims, No Drawings

GROUTING COMPOSITION COMPRISING SLAG

This invention provides an improved and economical grouting composition or grout, which is suitable for stabilizing and strengthening earthen formations, especially those employed in permanent structures such as buildings, tunnels and dams. The composition and the methods and procedures for its use are particularly suited to curtain grouting dams, sealing off underground streams, isolating of buried containers, reinforcing and protecting of building foundations, protecting of excavations, especially those used in the construction of subways, breakwater and bridge piers, and other applications for sealing or closing of passageways to the transport of fluids therethrough. The grouting composition of this invention is particularly fluid having an equal or greater weight of water than cementitious material.

Although relatively low in cost, the composition is surprisingly efficient, especially in a one component injection process. The composition has low viscosity, predictable set time, high ultimate strength and producing a sealed formation of very low permeability to fluids, particularly aqueous systems. This composition, comprising a suspension of cementitious solids, penetrates formations with a facility hithertofor considered characteristic of solution grout compositions but develops the higher formation strength characteristic of the best suspension compositions.

Being free of organic chemicals except for a small amount of dispersant, by its nature substantive to the matter in the formation being grouted, the grout of this invention is non-polluting. This grout does not contribute to underground water or soil pollution in formations in which the grout is used. The non-polluting aspect of the grout is particularly important in environmental improvement applications. In these applications the very low permeability, to water and other fluids, of the grouted substrate is a most significant property resulting from the use of this invention. Examples of environmental improvement applications are the sealing of reservoirs for storage of waste materials, including toxic and radioactive wastes, and the sealing of formations where unwanted seepage into underground aquifers is occurring.

A major application of the grout of this invention is rehabilitation of structures such as buildings, bridges, dams and subways. A particularly important application is the regrouting of dam curtains, especially grouted curtains which have shown evidence of deterioration. Such deterioration is often evidenced by increased seepage and even eventual loss of dam core material.

The "one component" or single fluid grout of this invention does not have the difficultly controlled on site mixing and proportioning operations inherent in other types such as "two component" systems. The single fluid grout of this invention contain the necessary ingredients to produce the final high strength solidified state. The single fluid grout is programmed, by composition, to have a set time high enough to facilitate ease of injection into a formation to be grouted yet low enough to prevent its dilution or loss from the formation grouted.

However, in certain applications of this invention very fast set times, such as five to thirty minutes, are desired. These are readily achieved by two component grout compositions which employ the ultrafine cementitious materials in one component and silicates in a second component.

In its various aspects this invention concerns: (1) a composition adapted for use in grouting, (2) a method of grouting comprising preparing the composition and injecting the composition into a formation and (3) a formation grouted by the composition.

The grouting composition of this invention comprises an ultrafine slag and water. The ultrafine slag is a cementitious material (CM) having a specific surface area greater than 9500, preferably greater than 11,000 and most preferably greater than 13,000 square centimeters per gram and, by weight, less than 3%, preferably less than 1.5% and most preferably no particles of the slag larger than 7.8 micrometers ($\mu$m) in diameter. (The surface area and particle size are measured by the use of the Microtrac ® instrument further described hereinbelow.) An optional cementitious material in the composition is cement having a specific surface area greater than 7000, preferably greater than 8000 and most preferably greater than 9000 square centimeters per gram with, by weight, less than 16%, preferably less than 7% and most preferably less than 3% of particles of the cement larger than 7.8 micrometers in diameter as measured by the Microtrac ® instrument. The preferred cement is portland cement.

The cementitious material is at least 40%, preferably 60%, more preferably 80% and most preferably 100% slag by weight.

The water to cementitious material weight ratio is 1:1 to 12:2, or greater preferably 1.5:1 to 7:1 and most preferably 2:1 to 3:1 i.e. there is always at least as much water as cementitious material and sufficient water to form a flowable grout.

For adapting to specific use requirements or operating conditions, additional materials in the grout are as follows, amounts being in weight percent solids based on the weight of cementitious material unless otherwise noted:

An effective amount of dispersant to disperse the cementitious material, preferably up to 2%, and most preferably 0.2% to 0.5%.

NaOH, $Na_2CO_3$ or a mixture of these, when employed, is greater than zero and up to about 15%, preferably up to 10% and most preferably about 3% to 8% of the weight of slag plus about 0% to 4% of the weight of cement.

An alkali silicate, when employed, is greater than zero and up to about 150%, preferably 30% to 75%.

When an alkali silicate is present, up to about 10%, preferably about 1% to 5% of orthophosphate ion is also provided.

Other optional ingredients comprise materials such as inert filler material as discussed hereinbelow.

In certain applications combinations of slag and cement have the most appropriate properties, in others, alkali silicate is desired as a third large component of the composition, in still others, slag and silicate give the desired properties. One of the advantages of this invention is the ease with which the composition can be altered to adapt to set time, strength, ultimate permeability of the grouted formation and other requirements for the specific job. Combinations of portland cement and slag in the composition furnish grouts having an outstanding combination of permeation, set time and strength; even modest amounts of cement in such compositions produce grout having a controllable desirable set time. Combinations of these ingredients lead to optimum strength, particularly unconfined compressive strength.

The slag employed in this invention is a by-product obtained in the blast furnace process of smelting iron ore to produce iron. The slag is produced by a conventional process, outlined below, utilizing grinding and separating steps well known in the art. In the blast furnace, slag is generated, typically at about 1550° to 1650° C., from other minerals in the iron ore, coke ash and the limestone used as a flux. This slag is skimmed from above the iron, granulated by treatment with water and ground. Typically the granulation employs high pressure water sprays followed by immersion of the slag in a pit of water to produce a slag having a high glass content. However produced, it is desired that the slag used in this invention have a high glass content, preferably above about 95% glass. It is also preferred that the water content be low, preferably below about 15%. Typical dry composition range and two examples of slag are (in weight percent):

| Composition | $SiO_2$ | $Al_2O_3$ | CaO | MgO | FeO | S | $Mn_2O_3$ |
|---|---|---|---|---|---|---|---|
| Usual Range | 30–40 | 8–18 | 35–50 | 0–15 | 0–1 | 0–2 | 0–2 |
| Typical | 36.4 | 16.0 | 43.3 | 3.5 | 0.3 | 0.5 | <0.1 |
| Typical | 35.5 | 11.4 | 39.4 | 11.9 | 0.2 | 0.2 | — |

The slag used in this invention has a specific surface area over 9500 cm$^2$/gm, desirably over 11000 cm$^2$/gm and most preferably over 13000 cm$^2$/gm.

The high glass content, finely divided slag yields a grout having excellent sulfate resistance and readily controlled setting and hardening times in a relatively inexpensive formulation. High sulfate resistance is particularly important with regard to long term stability of the grouted formation. Grout failures after five or ten years have been attributed to sulfate attack. The slag-rich compositions of the present invention have long term stability in formation and are also useful in regrouting formations in which a previous grout has exhibited signs of failure. The grout is particularly inexpensive because of the comparatively low cost of slag, a byproduct of iron production.

High level of penetration into a tight formation associated with high permanance renders the instant composition valuable in many applications. One example is in radioactive waste storage in shafts deep in rock formations where the instant grout composition is employed to permeate the rock around the waste containers and thus furnish a secondary barrier to both intrusion of ground water and leaking of waste from the containers.

Portland cement is a hydraulic cement consisting mainly of calcined silicates of calcium. Five types of portland cement (I through V) are generally recognized, their manufacture, properties and characteristics are described in detail by J. F. Young, ACI (American Concrete Institute, Detroit, Mich.) Education Bulletin No. E3-83, pages 1 through 8, herein incorporated by reference.

It is a novel feature of this invention that cementitious material having the fine particle size and distribution described is formulated in a composition producing a high strength grout having a readily controlled set time.

While portland cement and/or slag are preferably used without inert filler material, in some instances it may be desirable to incorporate limited amounts of other solids meeting the particle size specifications specified for slag hereinabove. Such other solids are clay, bentonite, kaolin, vermiculite, limestone, silica flour, silica fume and other well known inert solids. The amount of these employed is to be minor so as not to reduce the strength of the set grout below desired values such as those in the examples of this invention hereinbelow.

The alkali silicate is preferably an aqueous colloidal suspension of an alkali salt of silicic acid. Throughout the specifications and claims, the term "alkali silicate" is intended to refer to alkali metal silicates having an alkali metal oxide:silicon dioxide weight ratio within the range of from about 1.0:3.0 to 1.0:4.0, notably sodium silicates having a sodium oxide:silicon dioxide weight ratio within the range of from about 1:3.0 to 1:4.0, preferably, about 1:3.0 to 1:3.5. An especially preferred material is an aqueous sodium silicate having a sodium oxide:silicon dioxide ratio of about 1:3.2 to 1:3.3 and a $Na_2O:SiO_2$ solids content of about 35 to 45%. The term "alkali metal", as used in the specification and claims is intended to refer to the various alkali metals, i.e., sodium, potassium, lithium, rubidium, cesium and mixtures thereof. Silicates of potassium and sodium are more generally available. Because of their lower cost and availability, sodium silicates are more widely used and therefore are preferred in the practice of the present invention. Particular reference hereinafter is made to such silicates. The alkali silicate is especially useful in the preparation of low cost compositions having a very fast set time for uses such as underground water control.

The dispersant is selected from the well-known group of materials used to disperse solids, preferably water-wetable solids, in aqueous systems. The dispersant serves to aid the penetration of water into the finely divided solids to produce a suspension of unassociated or unagglomerated particles. These dispersants are generally negatively charged or anionic electrolytes especially polyelectrolytes, such as polycarboxylates and polysulphonates. Examples include sodium or ammonium salts of polymethacrylic acid, diisobutylene-maleic anhydride copolymer, copolymers of acrylic, methacrylic and maleic acids, organic phosphates, sulfonated naphthalene formaldehyde condensates, sulfonated natural products and other sulfonated polymer condensates.

The orthophosphate ion is any of the orthophosphate ions generally existing in equilibrium with each other in aqueous solution, $PO_4^{---}$, $HPO_4^{--}$ and $H_2PO_4^{-}$. In highly alkaline systems it is expected that $PO_4^{---}$ predominates. Two of the most available sources of orthophosphate ion are orthophosphoric acid, $H_3PO_4$ and sodium phosphate decahydrate, $Na_3PO_4.10H_2O$. Phosphoric acid is commonly the commercial grade 85%, by volume, with water. Other phosphates such as the polyorthophosphates, may be employed as the source of the orthophosphate ion. The orthophosphate ion is useful in control of the set time, especially in grout compositions comprising alkali silicates, by delaying setting.

The NaOH is commercially available in solid and aqueous solution grades, the $Na_2CO_3$ is usually a solid grade, each serves to control the rate of hardening of the composition, particularly in formulations high in slag. Thus, NaOH and/or $Na_2CO_3$ may be regarded as a set time catalyst which has little if any effect on other properties of the grout, however overdosage will decrease strength. Favored are formulations in which the Na₂CO₃ is less than equal to NaOH by weight.

The importance of controlled rapid set time is seen, for example, in dam curtain rehabilitation. In a typical case water is moving through the curtain, at perhaps one or two feet per hour, and the grout injection holes in the dam curtain are on ten foot centers. Thus the set time of the grout must be less than five hours, preferably in the half hour to five hour range and must be predictable. This invention teaches predictability in both set time and permeation, particularly in tight formations previously grouted where degraded cement results in increased seepage. The ultrafine slag permeates the degraded cement, hardens and reduces seepage of the rehabilitated dam grout curtain.

In general, portland cement contributes to decreasing the set time and increasing the strength of a formulation. Slag, without cement has longer set times but this is controlled by the use of NaOH and Na₂CO₃. Higher than optimum levels of NaOH and Na₂CO₃ tend to decrease the final strength and increase the cost of the formulation. When alkali silicate is employed, optimization of the slag-cement-silicate ratios can result in a formulation with too fast a set. This low set time can then be increased, with little effect on strength, by the addition of phosphate ions. In all formulations the viscosity of the grout is readily controlled by the amount of water present. Thus in each case the invention teaches the balancing of the composition variables needed to give the optimum grout for the given application.

Another novel feature of this invention is based on the finding that NaOH and Na₂CO₃ are unexpectedly efficient and effective in controlling the set time of mixtures of slag and alkali silicate. When cement is used to control the set time of admixtures with slag and silicate there is the difficulty of mixing the appropriate ratio of the three large components in the field and a second difficulty is that flocculation of the system occur before setting. The latter leads to poor permeation of the formation being grouted. The use of NaOH, Na₂CO₃ or a mixture of these speed the set time to a suitable range, employing a small amount which is easily measured and added in the field, and additionally produces no separation or flocculation in the grout before setting. Finer control of the set time can be obtained by the addition of phosphate ion as in other alkali silicate systems, if desired.

Without being bound by theory, offered as a pedagogical aid in teaching the invention, it is clear that since the slag is essentially free of available calcium ion the formation of calcium silicate does not occur. The formation of the calcium salt is likely to be responsible for the separation or flocculation observed when cement is present. The lack of exchangeable calcium in slag is also thought to contribute to the effectiveness of the NaOH and Na₂CO₃ in acceleration of the setting of silicate-slag systems.

The following examples will further illustrate the invention but are not intended to limit it in any way. All parts and percentages are by weight and all temperatures in degrees Centigrade unless otherwise noted.

Particle Size of Cementitious Materials

The particle size of the materials is determined by a laser light scattering particle size distribution apparatus identified as a Microtrac ® particle size analyzer (Leeds and Northrup Instruments, North Wales, Pa. 19454). Measurements are made in the 0.7 to 125 millimicron (um) range and are presented in terms of the volume of particles in size channels having a size ratio of approximately 1.4 between channels. Table I. presents results of the average of three runs given as the percent larger than the stated size for each channel limit and the calculated volume surface area of the sample in square meters per cubic centimeter. The volume surface area can be converted to the specific surface, in square meters per gram, by dividing by the density of the material. Portland cement density is considered 3.15 grams per cubic centimeter as in ANSI/ASTM standard C 204-78a; slag density is considered 2.92 grams per cubic centimeter.

The procedure for analyzing slag samples in the Microtrac ® is as follows: Two grams of slag are dispersed in reagent grade alcohol (denatured ethanol) until the equilibrium uncalibrated sample volume (dV) is reached without the presence of air bubbles. Each sample is analyzed in three 30 second runs, the results are then averaged.

The particle size data resulting from a triplicate set of Microtrac ® measurements are a table of volume percent of sample larger than a given size, diameter, in micrometers. The Microtrac ® instrument also furnishes the following summary data, employing these abbreviations:

dV: Uncalibrated Sample Volume
%10: Microns at 10th percentile
%50: Microns at 50th percentile
%90: Microns at 90th percentile
MV: Volume Mean Diameter
CS: Calculated Surface Area (m²/cc)
STD. DEV.: Standard Deviation
Ma: Area Mean Diameter Table I presents the particle size data for typical examples of the slag of this invention (M1) and the cement of this invention (M3). In table II is a summary of the particle size data obtained on a number of samples.

Particle Size Distribution, Table I.

| Channel Upper Limit (um) | Percent Larger Than | |
|---|---|---|
| | Sample M1 | Sample M3 |
| 31 | 0.0 | 0.0 |
| 22 | 0.0 | 1.1 |
| 16 | 0.0 | 3.9 |
| 11 | 0.0 | 7.4 |
| 7.8 | 1.5 | 14.9 |
| 5.5 | 8.4 | 27.6 |
| 3.9 | 19.4 | 42.8 |
| 2.8 | 34.1 | 57.0 |
| 1.9 | 53.9 | 72.6 |
| 1.4 | 76.0 | 87.8 |
| 0.9 | 92.9 | 97.8 |
| 0.7 | 100.0 | 100.0 |

Summary of Microtrac Data, Table II.

| Sample | Code | % Coarser than 11 um | % Coarser than 7.8 um | CS | cm²/gm |
|---|---|---|---|---|---|
| M1 | 4/17 | 0.0 | 1.8 | 3.901 | 13200 |
| M1 | 5/8 | 0.0 | 0.8 | 4.035 | 13900 |
| M1 | 5/8 | 0.0 | 0.9 | 3.710 | 12700 |
| M1 | 8/15 | 0.0 | 1.5 | 3.176 | 10900 |
| M1 | 8/15 | 0.0 | 1.8 | 3.065 | 10500 |
| M1 | 12/5 | 0.0 | 0.0 | 4.391 | 15100 |
| M1 | 12/5 | 0.0 | 0.2 | 3.981 | 13600 |

-continued

Summary of Microtrac Data, Table II.

| Sample | Code | % Coarser than 11 um | % Coarser than 7.8 um | CS | cm²/gm |
|---|---|---|---|---|---|
| M1 | 12/5 | 0.0 | 0.4 | 3.856 | 13200 |
| M3 | 5/8 | 7.4 | 14.9 | 2.263 | 7180 |
| M3 | 5/8 | 7.5 | 14.7 | 2.321 | 7370 |
| M5 | 4/17 | 2.3 | 10.9 | 2.570 | 8480 |
| M5 | 5/8 | 1.3 | 7.5 | 2.876 | 9490 |
| FS | 4/17 | 2.3 | 8.6 | 2.572 | 8810 |
| FS | 8/15 | 2.0 | 5.5 | 2.886 | 9880 |
| FS | 8/15 | 1.4 | 4.4 | 2.762 | 9460 |
| OS | 8/15 | 27.7 | 39.8 | 1.683 | 5760 |
| OP I | 12/29 | 50.3 | 59.5 | 1.219 | 3870 |
| OP III | 12/29 | 40.0 | 49.2 | 1.667 | 5290 |

Symbols used in tables and examples:
M1 = ultrafine slag of this invention
M3 = ultrafine cement
M5 = ultrafine commercial slag/cement (80/20)
FS = fine slag
OS = ordinary slag
OP I = type I portland
OP III = type III portland

Set Time

Set time and Other Physical Measurements are determined by the following procedure, employing the formulations given in the tables.
1. Water is added to a plastic cup
2. NaOH and $Na_2CO_3$ are added as required and dissolved.
3. Dispersant is added and dissolved.
4. Cementitious material is added and agitated for 10 seconds by a high speed mixer.
5. The cup is tilted periodically while the CM surface is observed. When there is no flow or gross motion of the CM surface while the cup is tilted to 45 degrees the time is noted; this is the set time.

Other observations are also made on the sample. A qualitative estimate of the viscosity is made after the gross air entrained by the agitation has left but well before the sample has set. Estimated viscosities are: medium—approximates mid-range motor oil, high—approximates glycerine, low—water viscosity; all at room temperature. The color of the sample is observed; in some formulations this is a quick indication of hardening. Particularly at high water ratios, settling of the CM is observed; the percent of the total volume present as clear surface liquid is reported as percent settlement. Hardness development is monitored by measurement of the compressive strength and is reported along with the time after sample preparation. The strength measurement employs a handheld penetrometer (Soiltest CL-700 Pocket Penetrometer, Soiltest Inc., Chicago, Ill.) and follows the manufacturers instructions. The penetrometer is held by its handle with the piston at right angles to the CM surface. With steady pressure the piston is pushed into the CM to the depth of the calibration groove about ¼ inch from the end of the piston. The compressive strength is read on the scale of the instrument.

Examples 1 and 2 show the effects of water ratio, NaOH content and $Na_2CO_3$ content on the set time and other properties. It is seen that formulations with NaOH have lower viscosities than those with $Na_2CO_3$, thus promote ease of permeation by the grout, but have higher set times.

M1, M3 and M5 are as defined in Summary of Microtrac Data, Table II above. N2 is the dispersant, at 43% solids aqueous, sodium naphthalene sulfonate formaldehyde polymer (CAS No. 9084-06-4). When present sodium silicate ($SiO_2/Na_2O = 3.22$; employed as 37.8% aqueous) is further diluted with the second water charge to make the second component of a two component system. The two components are then mixed and the timing started. $H_3PO_4$, orthophosphoric acid, is 85% acid (aqueous).

EXAMPLE 1

Accelerators

1:1 Water/CM Ratio

| | A | B | C | D | E | F | G | H | I |
|---|---|---|---|---|---|---|---|---|---|
| Formulation | | | | | | | | | |
| Water (gms) | 50 | 50 | 50 | 50 | 50 | 50 | 50 | 50 | 50 |
| NaOH (gms) | 1 | 2 | 4 | | | | 0.5 | 1 | 2 |
| $Na_2CO_3$ (gms) | | | | 1 | 2 | 4 | 0.5 | 1 | 2 |
| N2 (43%) (gms) | 0.5 | 0.5 | 0.5 | 0.5 | 0.5 | 0.5 | 0.5 | 0.5 | 0.5 |
| M1 (gms) | 50 | 50 | 50 | 50 | 50 | 50 | 50 | 50 | 50 |
| Results | | | | | | | | | |
| Viscosity | low | low | low | med | med | high | low | low | med |
| minutes | 15 | 13 | 12 | 10 | 9 | 9 | 7 | 6 | 5 |
| Set time (hr) | 24 | 8 | 4.8 | 4.7 | 1.7 | 0.6 | 9 | 4.7 | 1.2 |
| kg/cm²[1] | >4.5 | >4.5 | >4.5 | 0.25 | >4.5 | >4.5 | >4.5 | >4.5 | 3.0 |
| hours | 33 | 21 | 21 | 21 | 21 | 21 | 21 | 21 | 4.7 |
| kg/cm²[1] | | | | >4.5 | | | | | >4.5 |
| hours | | | | 34 | | | | | 7.8 |
| Color | lb | lb | lb | lb | lb | mb | lb | mb | mb |
| hours | 46 | 21 | 21 | 21 | 21 | 21 | 21 | 21 | 4.7 |

[1]Unconfined Compressive Strength
lb light blue
mb medium blue

EXAMPLE 2

Accelerators

2:1 Water/CM Ratio

| | A | B | C | D | E | F | G | H | I |
|---|---|---|---|---|---|---|---|---|---|
| Formulation | | | | | | | | | |
| Water (gms) | 100 | 100 | 100 | 100 | 100 | 100 | 100 | 100 | 100 |
| NaOH (gms) | 2 | 4 | 6 | | | | 1 | 2 | 3 |
| $Na_2CO_3$ (gms) | | | | 2 | 4 | 6 | 1 | 2 | 3 |

-continued

|  | A | B | C | D | E | F | G | H | I |
|---|---|---|---|---|---|---|---|---|---|
| N2 (43%) (gms) | 0.5 | 0.5 | 0.5 | 0.5 | 0.5 | 0.5 | 0.5 | 0.5 | 0.5 |
| M1 (gms) | 50 | 50 | 50 | 50 | 50 | 50 | 50 | 50 | 50 |
| Results |  |  |  |  |  |  |  |  |  |
| Viscosity | low | low | low | med | med | high | low | med | high |
| hours | 1.4 | 1.4 | 1.4 | 1.4 | 1.4 | 1.4 | 1.4 | 1.4 | 1.4 |
| Settlement (%) | 50 | 50 | 30 | 20 | 20 | 20 | 30 | 20 | 10 |
| Set time (hr) | 8 | 6 | 4 | 8 | 6 | 4.5 | 9 | 4.5 | 2.1 |
| kg/cm$^2$(1) | 0.5 | 2.0 | 2.3 | soft | soft | 0.5 | 4.0 | 0.25 | 4.0 |
| hours | 18 | 14 | 14 | 20 | 20 | 18 | 14 | 7.5 | 7.5 |
| kg/cm$^2$(1) | 2.3 | 3.7 | 3.7 | >4.5 | >4.5 | >4.5 | >4.5 | >4.5 | >4.5 |
| hours | 20 | 20 | 20 | 33 | 33 | 20 | 20 | 10 | 10 |
| kg/cm$^2$(1) | >4.5 | >4.5 | >4.5 |  |  |  |  |  |  |
| hours | 72 | 72 | 72 |  |  |  |  |  |  |
| Color | mb | lb | lb | lb | lb | lb | lb | lb | lb |
| hours | 72 | 14 | 14 | 33 | 33 | 18 | 14 | 10 | 10 |

(1)Unconfined Compressive Strength
Color Code
mb medium blue
lb light blue

EXAMPLE 3

Comparison of Set Times for M1, M3, and M5

|  | A | B | C | D | E | F | G | H |
|---|---|---|---|---|---|---|---|---|
| Formulation |  |  |  |  |  |  |  |  |
| Water (grams) | 50 | 50 | 50 | 50 | 100 | 100 | 100 | 100 |
| N2 (43% solids) | 0.5 | 0.5 | 0.5 | 0.5 | 0.5 | 0.5 | 0.5 | 0.5 |
| M1 (grams) | 50 |  |  | 40 | 50 |  |  | 40 |
| M3 (grams) |  | 50 |  | 10 |  | 50 |  | 10 |
| M5 (grams) |  |  | 50 |  |  |  | 50 |  |
| Results |  |  |  |  |  |  |  |  |
| Viscosity | low | high | low | low | low | med | med | low |
| minutes | 15 | 10 | 8 | 5 | 60 | 55 | 50 | 45 |
| Settlement (%) | 15 | 10 | 5 | 5 | 10 | 15 | 20 | 15 |
| minutes | 93 | 75 | 67 | 67 | 55 | 50 | 41 | 36 |
| Set time (hrs) | — | 0.8 | 1.3 | 0.8 | 3.3 | 2.7 | 1.7 | 8.3 |
| kg/cm$^2$(1) | soft | 0.7 | 4.0 | 3.5 | soft | 4.0 | 0.3 | 0.3 |
| hours | 23 | 9 | 23 | 23 | 46 | 23 | 22 | 22 |
| kg/cm$^2$(1) | 1.3 | 3.0 | >4.5 | >4.5 | >4.5 | >4.5 | >4.5 | >4.5 |
| hours | 48 | 12 | 48 | 46 | 129 | 46 | 45 | 46 |
| kg/cm$^2$(1) | >4.5 | >4.5 |  |  |  |  |  |  |
| hours | 94 | 23 |  |  |  |  |  |  |
| Color | w | dg | db | db | w | dg | db | b |
| hours | 94 | 96 | 96 | 96 | 47 | 46 | 45 | 45 |

(1)Unconfined Compressive Strength
Color Code:
w = white
dg = dark gray
db = dark blue
b = blue

EXAMPLE 4

Set Time of Silicate/CM

|  | A | B | C | D | E | F | G | H | I |
|---|---|---|---|---|---|---|---|---|---|
| Formulation |  |  |  |  |  |  |  |  |  |
| Water (gms) | 50 | 50 | 60 | 60 | 60 | 60 | 60 | 60 | 60 |
| N2 (43%) (gms) | 0.5 | 0.5 | 0.5 | 0.5 | 0.5 | 0.5 | 0.5 | 0.5 | 0.5 |
| M1 (gms) | 50 |  | 18 | 16 | 20 |  |  | 10 | 15 |
| M3 (gms) |  |  | 2 | 4 |  | 20 |  | 10 | 5 |
| M5 (gms) |  | 50 |  |  |  |  | 20 |  |  |
| Water (gms) |  |  | 40 | 40 | 40 | 40 | 40 | 40 | 40 |
| Silicate SiO$_2$/Na$_2$O(3.22, 37.8%) (gms) |  |  | 38 | 38 | 38 | 38 | 38 | 38 | 38 |
| Results |  |  |  |  |  |  |  |  |  |
| Set time (min) | 22 hr | 8 hr | 20 | 6 | 6 hr | 0.5 | 1.7 | 2 | 3 |
| Settlement (%) | 10 | 20 | 0 | 0 | 50 | 0 | 0 | 0 | 0 |
| hours | 14 | 14 |  |  | 34 |  |  |  |  |
| kg/cm$^2$(1) | soft | soft | soft | soft | soft | 0.75 | 0.7 | 1.0 | 0.2 |
| hours | 14 | 14 | 45 | 8 | 34 | 1 | 8 | 4 | 4 |
| kg/cm$^2$(1) | >4.5 | >4.5 | soft | 0.8 | soft | 3 | 1.2 | 1.8 | 1.3 |
| hours | 82 | 82 | 94 | 70 | 93 | 4 | 22 | 19 | 19 |
| kg/cm$^2$(1) |  |  | soft | >4.5 | soft | >4.5 | >4.5 | >4.5 | >4.5 |
| hours |  |  | 183 | 172 | 183 | 20 | 70 | 82 | 82 |
| Color | w | b | w | g | w | g | g | g | g |

-continued

|  | A | B | C | D | E | F | G | H | I |
|---|---|---|---|---|---|---|---|---|---|
| hours | 82 | 82 | 94 | 70 | 93 | 20 | 22 | 34 | 34 |

[1]Unconfined Compressive Strength
Color Code:
w = white
b = blue
g = gray

EXAMPLE 5

Set Time of Silicate/CM

|  | A | B | C | D | E | F | G | H | I |
|---|---|---|---|---|---|---|---|---|---|
| Formulation |  |  |  |  |  |  |  |  |  |
| Water (gms) | 50 | 50 | 50 | 50 | 50 | 50 | 60 | 60 | 60 |
| N2 (43%) (gms) | 0.5 | 0.5 | 0.3 | 0.3 | 0.5 | 0.5 | 0.2 | 0.2 | 0.2 |
| NaOH (gms) | 2 |  | 0.5 |  | 1.0 |  | 0.8 |  |  |
| $Na_2CO_3$ (gms) |  | 2 |  | 0.5 |  | 1.0 |  |  |  |
| M1 (gms) | 50 | 50 | 25 | 25 | 50 | 50 | 20 |  |  |
| M5 (gms) |  |  |  |  |  |  |  | 20 |  |
| M3 (gms) |  |  |  |  |  |  |  |  | 20 |
| water (gms) | 40 | 40 | 20 | 20 | 40 | 40 | 40 | 40 | 40 |
| $H_3PO_4$(85%) (gms) |  |  |  |  |  |  |  | 0.4 | 0.4 |
| Silicate as in Ex. 4 (gms) | 38 | 38 | 19 | 19 | 38 | 38 | 38 | 38 | 38 |
| Results |  |  |  |  |  |  |  |  |  |
| Viscosity | med | high | low | low | low | med | low | low | low |
| Set Time (hr) | 0.15 | 0.25 | 0.7 | 1.5 | 0.33 | 0.5 | 4.7 | 0.16 | 0.03 |
| $kg/cm^{2(1)}$ | 0.3 | s | s | s | s | vs | vs | 0.1 | 0.2 |
| hours | 0.66 | 15 | 15 | 15 | 15 | 14 | 18 | 4 | 0.5 |
| $kg/cm^{2(1)}$ | 1.5 | s | s | s | 1.2 | vs |  | 0.2 | 0.5 |
| hours | 16 | 40 | 24 | 24 | 24 | 24 |  | 18 | 4 |
| $kg/cm^{2(1)}$ | 4.5 |  | s | s | s | vs |  |  | 0.7 |
| hours | 24 |  | 39 | 39 | 39 | 38 |  |  | 17 |

[1]Unconfined Compressive Strength
Qualitative hardness code:
s = soft
vs = very soft

EXAMPLE 6

Permeation Test

The apparatus consists of:
(1) a cell filled with fine sand, closed at each end by a stopper having a single central hole,
(2) a pressurized grout supply tank connected to the bottom of the cell by tubing and
(3) a delivering system consisting of a tube, connected to the top of the cell, leading to a graduated cylinder collector vessel. The cell is a 5 cm I.D., 15 cm long glass cylinder having a sand-retaining assembly at each end.

Each assembly consists of:
(1) a 70 mesh per inch polyester sieve cloth for retaining the sand,
(2) a close-fitting ca 5 cm O.D. flanged disk with 12 holes 1/16 inch in diameter therethru,
(3) a rubber stopper to seal the cylinder and to bear on the flange of the disk thereby creating a small plenum chamber between the disk and the stopper and
(4) a metal end plate having a central hole to accommodate the tube passing therethru and edge-holes to accommodate threaded rods. Wing nuts on the threaded rods tighten down on the end plates thus forming a frame which clamps the assembly together so it can be pressurized without leaking.

Permeation Test Procedure

1. Press a rubber stopper into an end of the glass cylinder and then put a perforated disk and a sieve cloth into the tube.
2. Weigh enough Evanston beach sand for one sample.
3. Pour one third of the sand into the glass cylinder.
4. Place a solid metal cylinder as a weight (about 320 grams) on the top of the sand, and apply a vibrator in the sand or against the glass.
5. Repeat steps 3 and 4 twice: then place a sieve cloth and a perforated disk on the top of the sand.
6. Press a rubber stopper on the other end of the tube and assemble the frame.
7. Connect the supply and delivery tubes and apply pressure to water which is in the tank in order to saturate the sample.
8. Disconnect the tube connected to the bottom of the sample and let the water drain out by gravity. Record the volume of the water drained from the tube and label it as V1. This is the void volume in the sample before the injection of grout.
9. Prepare the grout and pour it into the tank emptied.
10. Apply 2 psi air pressure to the tank and collect the effluent from the top of the sample. Time the accumulated volumes of effluent and label them as V2, V3 etc.
11. The volume of slurry permeating the sample is V1 plus V2, V3, or V4 respectively.

Permeation Test Results

| Formulation | A | B | C | D | E | F | G | H |
|---|---|---|---|---|---|---|---|---|
| CM | M1 | M5 | M1 | FS | OS | M1 | M1 | M1 |
| Water:CM | 1:1 | 2:1 | 2:1 | 2:1 | 2:1 | 2:1 | 2:1 | 2:1 |

-continued

| Formulation | A | B | C | D | E | F | G | H |
|---|---|---|---|---|---|---|---|---|
| Dispersant | N2 | N2 | N2 | N2 | N2 | N2 | HSR | HSR |
| % solids on CM | 0.43 | 0.43 | 0.43 | 0.43 | 0.43 | 0.43 | 0.6 | 0.02 |
| Sand Wt (g) | 337 | 355 | 332 | 336 | 326 | 336 | 356 | 344 |
| Sand Ht (cm) | 9.7 | 10.1 | 9.0 | 9.8 | 9.7 | 9.9 | 10.4 | 10.1 |
| Sand d. (g/cc) | 1.68 | 1.7 | 1.78 | 1.66 | 1.62 | 1.64 | 1.65 | 1.64 |
| V1 (cc) | 13 | 13 | 14 | 11 | 13 | 12 | 14 | 13 |
| V2 + V1 (cc) | 55 | 51 | 99 | 62 | 30 | 112 | 92 | 60 |
| minutes | 1 | 1 | 1 | 1 | 1 | 1 | 1 | 1 |
| V3 + V1 (cc) | 81 | 101 | 204 | 93 | 38 | 249 | 162 | 65* |
| minutes | 5 | 5 | 5 | 5 | 5 | 10 | 10 | 5* |
| V4 + V1 (cc) | 89* | 123 | 326 | 122 | 62 | | | |
| minutes | 10* | 12 | 20 | 20 | 20 | | | |

*flow stopped

The test results showed the differences in permeation among the grouts consisting of two parts water to one part cementitous material, by weight, employing the N2 dispersant at 0.43% solids on cement. Data are also furnished (1) at a 1:1 ratio with water and (2) employing another dispersant, Lubricon HSR (American Admixtures, Inc., Chicago, IL 60646) a salt of Hydroxylated carboxylic acids.

EXAMPLE 7

Permeability of Grouted Formation

A confined column of Evanston beach sand is grouted with each of the following grout formulations in parts by weight:

| | A | B | C |
|---|---|---|---|
| M1 | 100 | 100 | 100 |
| N2 solids basis | 0.4 | 0.4 | 0.4 |
| NaOH | 1 | 5 | 10 |
| Water | 200 | 200 | 200 |

The permeability of the sand after the grout is hardened is very low being in the range $10^{-7}$ to $10^{-8}$ centimeters per second.

The Evanston beach sand is a fine sand having the following particle size distribution.

| US Standard Sieve: | 40 | 50 | 70 | 100 | 200 |
|---|---|---|---|---|---|
| Wt. percent finer: | 99 | 91 | 36 | 4 | 1 |

I claim:

1. A fluid composition for grouting comprising: (1) slag as a first cementitious material, the slag having a specific surface area greater than 9,500 square centimeters per gram and less than three weight percent of particles of the slag being larger than 7.8 micrometers in diameter and (2) an equal or greater weight of water.

2. The composition of claim 1 additionally comprising an effective amount of dispersant, to disperse the particles of slag, and the composition comprising up to 12 parts water per part slag, by weight.

3. The composition of claim 1 additionally comprising up to 15% NaOH, $Na_2CO_3$ or a mixture thereof based on the dry weight of the slag, and the slag having a specific surface area greater than 11,000 square centimeters per gram and less than 1.5%, by weight, of particles of the slag being larger than 7.8 micrometers in diameter.

4. The composition of claim 3 consisting essentially of one part slag and, based on the weight of the slag, 1.5 to 7 parts water, up to about 2% dispersant, and up to about 10% NaOH, $Na_2CO_3$ or a mixture thereof.

5. The composition of claim 4, the slag having a specific surface area greater than 13,000 square centimeters per gram with no particles of the slag being over 7.8 micrometers in diameter and, based on the weight of slag, about 2 to 3 parts water, about 0.2% to 0.5% dispersant and about 3% to 8% NaOH, $Na_2CO_3$ or a mixture thereof.

6. The composition of claim 1 additionally comprising a cement as a second cementitious material, the cement having a specific surface area greater than 7,000 square centimeters per gram and less than 16 weight percent of particles of the cement being larger than 7.8 micrometers in diameter, the slag being at least 40% of the total cementitious material by weight; the composition comprising up to 12 parts by water per part cementitious material by weight and an effective amount of a dispersant to disperse the cementitious material.

7. The composition of claim 6, the slag having a specific surface area greater than 11,000 square centimeters per gram with less than 1.5% by weight of particles of the slag being larger than 7.8 micrometers in diameter, the cement having a specific surface area greater than 8000 square centimeters per gram and less than 7% by weight of particles of the cement being larger than 7.8 micrometers in diameter, the slag being at least 60% of the cementitious material by weight, and additionally comprising NaOH, $Na_2CO_3$ or a mixture of these being up to 15% of the slag plus up to 4% of the cement by weight.

8. The composition of claim 7 comprising, per part cementitious material by weight, from 1.5 to 7 parts of water and up to 2% dispersant.

9. The composition of claim 8 consisting essentially of: slag having a specific surface area greater than 13,000 square centimeters per gram and no particles of the slag being larger than 7.8 micrometers in diameter; cement having a specific surface area greater than 9000 square centimeters per gram and less than 3% by weight of particles of the cement being larger than 7.8 micrometers in diameter; the slag being at least 75% by weight of the cementitious material; two to three parts of water per part of cementitious material by weight; 0.2% to 0.5% dispersant by weight based on the cementitious material; and $Na_2CO_3$, NaOH or a mixture of these being 3% to 8% of the slag plus zero to 2% of the cement by weight.

10. The composition of claim 2 additionally comprising greater than zero and up to 150% alkali silicate based on the weight of slag.

11. The composition of claim 10, the slag having a specific surface area greater than 11,000 square centimeters per gram and less than 1.5%, by weight, of particles of the slag being larger than 7.8 micrometers in diameter and, based on the weight of the slag, up to 2% dispersant and up to 10% orthophosphate ion.

12. The composition of claim 11 consisting essentially of slag having a specific surface area greater than 13,000 square centimeters per gram and no particles of the slag being larger than 7.8 micrometers in diameter; 1.5 to 7 parts of water per part of slag by weight; and, based on the weight of slag, 30 to 75% alkali silicate, 0.2% to 0.5% dispersant and 1 to 5% orthophosphate ion.

13. The composition of claim 10 additionally comprising a cement as a second cementitious material, the cement having a specific surface area greater than 7,000 square centimeters per gram and less than 16 weight percent of particles of the cement being larger than 7.8 micrometers in diameter, the slag being at least 40% of the cementitious material be weight.

14. The composition of claim 13 comprising: slag having a specific surface area greater than 11,000 square centimeters per gram and less than 1.5% of particles of the slag being larger than 7.8 micrometers in diameter, cement having a specific surface are greater than 8000 square centimeters per gram and less than 7% of particles of the cement being larger than 7.8 micrometers in diameter, and, based on the weight of cementitious material, up to 2% dispersant and up to 10% orthophosphate ion.

15. The composition of claim 14 consisting essentially of: slag having a specific surface area greater than 13,000 square centimeters per gram and no particles of the slag being larger than 7.8 micrometers in diameter; cement having a specific surface area greater than 9000 square centimeters per gram and less than 3% by weight of particles of the cement being larger than 7.8 micrometers in diameter; the slag being at least 75% by weight of the cementitious material; 1.5 to 7 parts of water per part of cementitious material by weight; and based on the weight of cementitious material, 30 to 75% alkali silicate, 0.2 to 0.5% dispersant and 1 to 5% orthophosphate ion.

16. The composition of claim 11 additionally comprising NaOH, $Na_2CO_3$ or a mixture of these, being greater than zero and up to 10% of the slag by weight.

17. The composition of claim 14 additionally comprising NaOH, $Na_2CO_3$ or a mixture of these, being greater than zero and up to 10% of the slag by weight.

* * * * *

UNITED STATES PATENT AND TRADEMARK OFFICE
CERTIFICATE OF CORRECTION

PATENT NO. : 4,761,183
DATED : Aug. 2, 1988
INVENTOR(S) : William J. Clarke

It is certified that error appears in the above-identified patent and that said Letters Patent is hereby corrected as shown below:

Column 1, line 11, cancel "of".
Column 1, line 12, cancel "of".
Column 1, line 13, cancel "of".
Column 1, line 29, after "compositions but" insert -- it--.
Column 1, line 30, cancel "higher" and insert -- high--.
Column 1, line 59, cancel "contain" and insert -- contains--.
Column 2, line 31, cancel "12:2" and insert -- 12:1--.
Column 6, line 36, cancel "Ma" and insert --MA--.
Column 7, line 22, cancel "Set Time" and insert --Set Time and Other Physical Measurements--.
Column 7, line 23 cancel the entire line starting "Set ..." and insert --Set time is deter---.
Column 8, Example 1, in the table footnotes below the line "$^{(1)}$Unconfined Compressive Strength" insert --color code--.
Column 12, line 56, cancel "tank emptied" and insert --emptied tank--.
Column 13, line 64, (Claim 3, first line) cancel "claim 1" and insert --claim 2--.

Signed and Sealed this

First Day of August, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,761,183
DATED : Aug. 2, 1988
INVENTOR(S) : William J. Clarke

It is certified that error appears in the above-identified patent and that said Letters Patent is hereby corrected as shown below:

Column 14, claim 6, line 8, cancel "by" and insert --of--.

Signed and Sealed this

Sixteenth Day of July, 1991

Attest:

HARRY F. MANBECK, JR.

Attesting Officer

Commissioner of Patents and Trademarks